(12) United States Patent
Tabaries

(10) Patent No.: US 12,549,395 B2
(45) Date of Patent: Feb. 10, 2026

(54) ROBUST STORAGE

(71) Applicant: STMicroelectronics International N.V., Geneva (CH)

(72) Inventor: Laurent Tabaries, Aubagne (FR)

(73) Assignee: STMicroelectronics International N.V., Geneva (CH)

( * ) Notice: Subject to any disclaimer, the term of this patent is extended or adjusted under 35 U.S.C. 154(b) by 26 days.

(21) Appl. No.: 18/778,136

(22) Filed: Jul. 19, 2024

(65) Prior Publication Data

US 2025/0030565 A1     Jan. 23, 2025

(30) Foreign Application Priority Data

Jul. 21, 2023   (FR) ...................... 2307836

(51) Int. Cl.
| | | |
|---|---|---|
| *H04L 29/06* | (2006.01) | |
| *H04L 9/00* | (2022.01) | |
| *H04L 9/06* | (2006.01) | |
| *H04L 9/32* | (2006.01) | |

(52) U.S. Cl.
CPC .............. *H04L 9/50* (2022.05); *H04L 9/0643* (2013.01); *H04L 9/3247* (2013.01)

(58) Field of Classification Search
CPC ........ H04L 9/50; H04L 9/0643; H04L 9/3247
See application file for complete search history.

(56) References Cited

U.S. PATENT DOCUMENTS

| | | | |
|---|---|---|---|
| 11,468,531 B1 * | 10/2022 | Sastry ...................... | G06F 1/329 |
| 11,870,909 B2 * | 1/2024 | Bres ...................... | H04L 9/0643 |
| 2019/0197130 A1 * | 6/2019 | Huang ...................... | H04L 9/50 |
| 2020/0099530 A1 * | 3/2020 | Khatib ...................... | G06F 18/24 |
| 2021/0067513 A1 | 3/2021 | Hassani et al. | |

(Continued)

FOREIGN PATENT DOCUMENTS

| | | |
|---|---|---|
| EP | 4207046 A1 | 7/2023 |
| FR | 3125937 A1 | 2/2023 |
| WO | WO 2022/097519 A1 | 5/2022 |

OTHER PUBLICATIONS

Fu M, Zhang C, Hu C, Wu T, Dong J, Zhu L. Achieving Verifiable Decision Tree Prediction on Hybrid Blockchains. Entropy (Basel). Jul. 1, 20233;25(7):1058. doi: 10.3390/e25071058. PMID: 37510005; PMCID: PMC10378298. (Year: 2023).*

(Continued)

*Primary Examiner* — Shawnchoy Rahman
(74) *Attorney, Agent, or Firm* — Alston & Bird LLP

(57) ABSTRACT

The present description concerns a method comprising: transmitting, by at least one peripheral circuit of a storage system for a motor vehicle, one or more data values to be stored, to at least two circuits of the vehicle; searching for a proof of work; transmitting, when a first one of the at least two circuits has found a potential proof of work, the potential proof of work to each of the other circuits; verifying the potential proof of work; and, if the verification confirms that the potential proof of work matches the proof of work searched for, the storage, in each of the circuits, of one or more data values in a current block of a blockchain, the one or more data values being stored in association with an identification value identifying the previous block, the proof of work, and an identification value identifying the current block.

14 Claims, 4 Drawing Sheets

(56) References Cited

U.S. PATENT DOCUMENTS

2022/0366494 A1* 11/2022 Cella ................... H04L 9/3231
2023/0259293 A1    8/2023 Xu et al.

OTHER PUBLICATIONS

Davi et al., "Combining Safety and Security in Autonomous Cars Using Blockchain Technologies", 9 aout 2019 (Aug. 9, 2019), Topics in Cryptology—CT-RSA 2020 : The Cryptographers' Track at the RSA Conference 2020, San Francisco, CA, USA, Feb. 24-28, 2020, Cornell University Library, 201 Olin Library Cornell University Ithaca, NY 14853, pp. 223-234, XP047525671.

* cited by examiner

ROBUST STORAGE

CROSS REFERENCE TO RELATED APPLICATIONS

This application claims the priority benefit of French patent application number FR2307836, filed on Jul. 21, 2023, entitled "Stockage robuste" which is hereby incorporated by reference to the maximum extent allowable by law.

TECHNICAL FIELD

The present disclosure generally concerns the storage of parameters describing events and/or states of a motor vehicle.

BACKGROUND

During the operation of a motor vehicle, data describing states such as, for example, the speed, the engine speed, the tire pressure, braking times, etc. are periodically recorded and stored in a non-volatile memory of the vehicle.

The storage of this data enables to trace back the vehicle history, for example after an accident.

However, in the case where the non-volatile memory having this data stored therein is damaged, for example in a shock, the data may be lost.

There is a need to improve the way in which this data is stored, to decrease the risk, in case of an accident damaging the vehicle, of losing the access to this data. Further, it is desirable for the accessible data to keep their integrity.

BRIEF SUMMARY

An embodiment provides a method comprising:
the transmission, by at least one peripheral circuit of a data storage system for a motor vehicle to at least two circuits of the motor vehicle, one or more data values to be stored;
searching, by each of the at least two circuits, for a proof of work;
when a first one of the at least two circuits has found a potential proof of work, the transmission, by said first circuit, of the found potential proof of work to each of the other circuits among the at least two circuits;
the verification, by each of the other circuits, of the potential proof of work; and
if the verification confirms that the potential proof of work effectively matches the proof of work searched for, the storage, in each of the circuits, of the one or more data values in a current block of a blockchain, the one or more data values being stored in association with an identification value identifying the immediately preceding block in the blockchain, the proof of work, and an identification value identifying the current block, the identification value of the current block being calculated based on the identification value of the immediately preceding block, on the one or more data values, and on the proof of work.

According to an embodiment, the above method further comprises, prior to storage in each of the at least two circuits, the calculation of a signature value based on the one or more data values, the identification value of the current block further being calculated based on the signature value.

According to an embodiment, the identification value of the current block is a hash value.

According to an embodiment, searching for the proof of work, by each of the at least two circuits, comprises:
a) the generation, by a number generator of said circuit, of a candidate value;
b) the supplying of the candidate value to a processor of said circuit;
c) the verification of whether the candidate value matches a target challenge value for a given response value; and
d) if the candidate value does not match, the repeating of a), b) and c) once or a plurality of times.

According to an embodiment, the candidate value matching the target challenge value is the proof of work.

According to an embodiment, the one or more data values correspond to recordings of parameters of the motor vehicle when its engine is running.

According to an embodiment, the above method further comprises other transmissions, by the at least one peripheral circuit to the at least two circuits, of one or more other data values to be stored, the other transmissions taking place at regular time intervals.

An embodiment provides a data storage system for a motor vehicle, the system comprising:
at least one peripheral circuit configured to transmit one or more data values to be stored to at least two circuits;
the at least two circuits configured to:
search for a proof of work;
as soon as a potential proof of work has been found by at least a first one of the two circuits, said first circuit is further configured to:
transmit the found potential proof of work to each of the other circuits among the at least two circuits, said other circuits being further configured to verify the potential proof of work; and
if the potential proof of work effectively matches the proof of work searched for, the at least two circuits are further configured to:
store the one or more data values in a block of a blockchain, the one or more data values being stored in association with an identification value identifying the immediately preceding block in the blockchain, the proof of work, and an identification value identifying the current block, the identification value of the current block being calculated based on the identification value of the immediately preceding block, on the one or more data values, and on the proof of work.

An embodiment provides a motor vehicle comprising the above system, wherein the at least two circuits are distributed in a network in the motor vehicle, each circuit being coupled to each of the other circuits by a communication link.

According to an embodiment, the communication link between the circuits uses a wired communication protocol, for example of Ethernet type or of controller area network, CAN, type.

According to an embodiment, the network formed by the circuits uses a wireless communication protocol.

According to an embodiment, at least 5, and for example at least 10, circuits form the network.

According to an embodiment, the at least one peripheral circuit is configured to store one or more parameters of the vehicle, the one or more parameters corresponding to the transmitted data values.

An embodiment provides a secure circuit comprising:
a number generator configured to generate candidate values;
a processor configured to verify whether each generated candidate value matches a target challenge value; and a non-volatile memory comprising a blockchain, the circuit being further configured to, when a candidate value matches the target challenge value, transmit said candidate value as a proof of work to other circuits, or to receive a proof of work, transmitted by another circuit, the processor then being further configured to verify whether the proof of work matches the target challenge value, the non-volatile memory being configured to store, in a current block of the blockchain, the one or more data values in association with an identification value identifying the block immediately preceding the current block, an identification value identifying the current block, and the proof of work, the processor being further configured to generate the value of the current block based on the identification value of the immediately preceding block, on the one or more data values, and on the proof of work.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the hash and signature calculation operations are not described in detail. Similarly, the proof-of-work validation protocols are not described in detail and are known to those skilled in the art.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
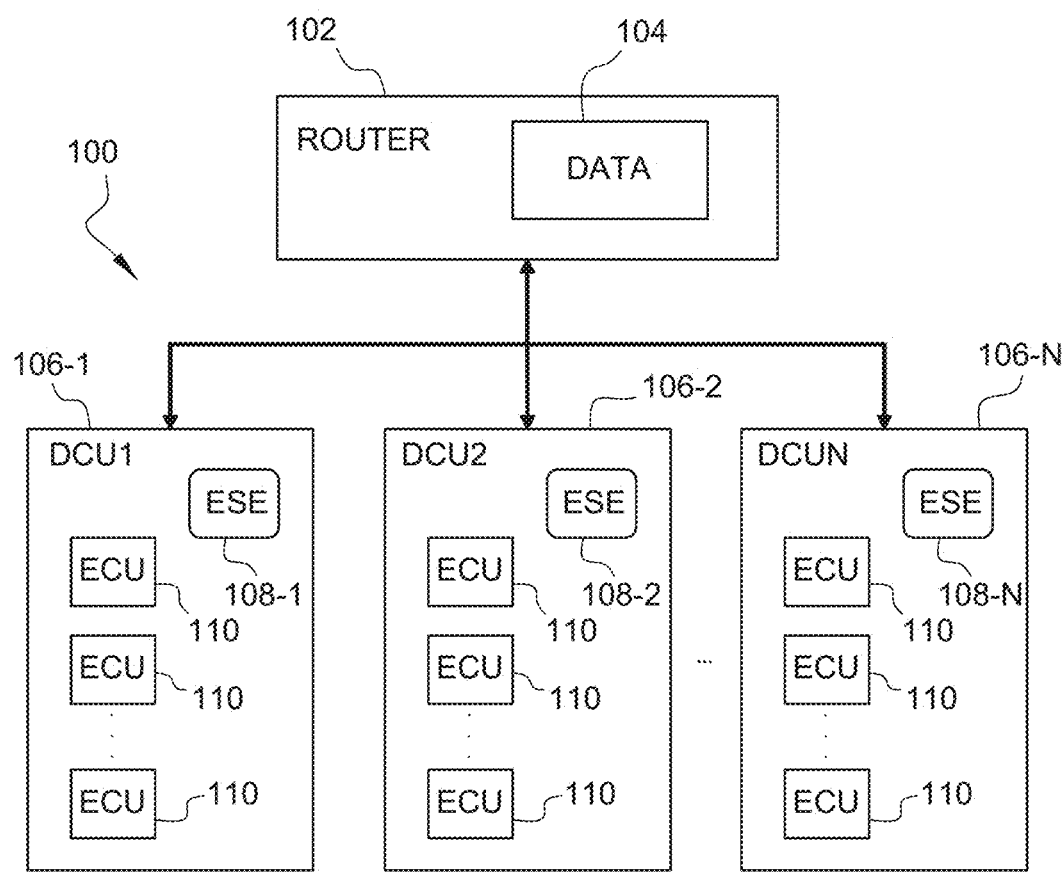
FIG. 1 is a block diagram showing a data storage system, according to an embodiment of the present disclosure.

FIG. 1 is a block diagram showing an electronic system 100, according to an embodiment of the present disclosure. According to an embodiment, system 100 is a data storage system for a motor vehicle.

System 100 comprises, for example, a router 102 (ROUTER) adapted to receiving and transmitting data values 104 (DATA). In an example, router 102 is an Internet communication module, such as a module having access to the fifth generation (5G) mobile phone network, or a module having access to the Internet through a wireless communication protocol of Wi-Fi type. Router 102 is thus adapted to receiving and transmitting data values within system 100, but also with one or more other electronic systems external to system 100.

For example, system 100 is adapted to implementing a multitude of functionalities which are gathered into a plurality of operating domains. System 100 comprises, for example, N operating domains 106-1 (DCU1), 106-2 (DCU2), ... and 106-N (DCUN), N being an integer greater than or equal to two. Each operating domain 106-$i$, $i$ being an integer varying from 1 to N, comprises at least one circuit 108-$i$ and one or a plurality of, generally between 2 and 20, electronic devices 110 (ECU), each adapted to implementing one or a plurality of functionalities. In certain embodiments, circuits 108-$i$ are secure circuits or secure elements, comprising secure storage means. In particular, a secure circuit is a circuit comprising mechanisms protecting processing and storage elements of sensitive data, making it difficult for unauthorized persons to extract the sensitive data.

A first operating domain may concern the engine domain, and comprise electronic devices managing, for example, fuel injection, engine operating modes, sensors enabling to monitor the proper operation and/or wearing of the engine, etc. A second operating domain may concern the safety within the vehicle, and comprise electronic devices managing, for example, the tire pressure, the brakes, emergency calls, etc. A third operating domain may concern the vehicle interior, and comprise electronic devices managing, for example, the air conditioning, the heating, the lighting, etc. A fourth operating domain may concern the multimedia content of the vehicle, and comprise electronic devices managing, for example, a radio or car radio, a sound system, one or more screens, etc.

In an example, one or more of the operating domains are configured to record history data, such as, for example, the vehicle speed, the time during which the engine is running, the wearing of the brakes, the tire pressure, the GPS (Global Positioning System) location of the vehicle, the engine temperature, the engine speed, and many other examples. This history data is for example supplied to router 102. According to an embodiment, router 102 is configured to control the storage of the history data in each of the secure circuits. As an example, router 102 is configured to control the storage of the history data acquired, for example, by the operating domains and/or other peripheral circuits of the motor vehicle, at regular time intervals, for example every second, every minute, or every hour. Router 102 is, for example, further configured to control the storage of the acquired history data at each stopping of the vehicle engine. In this case, system 100 for example remains powered for a certain period of time, for example some ten seconds, after the stopping of the engine, to be able to proceed to the storing of the history data into secure circuits 108-$i$.

Figure 2:
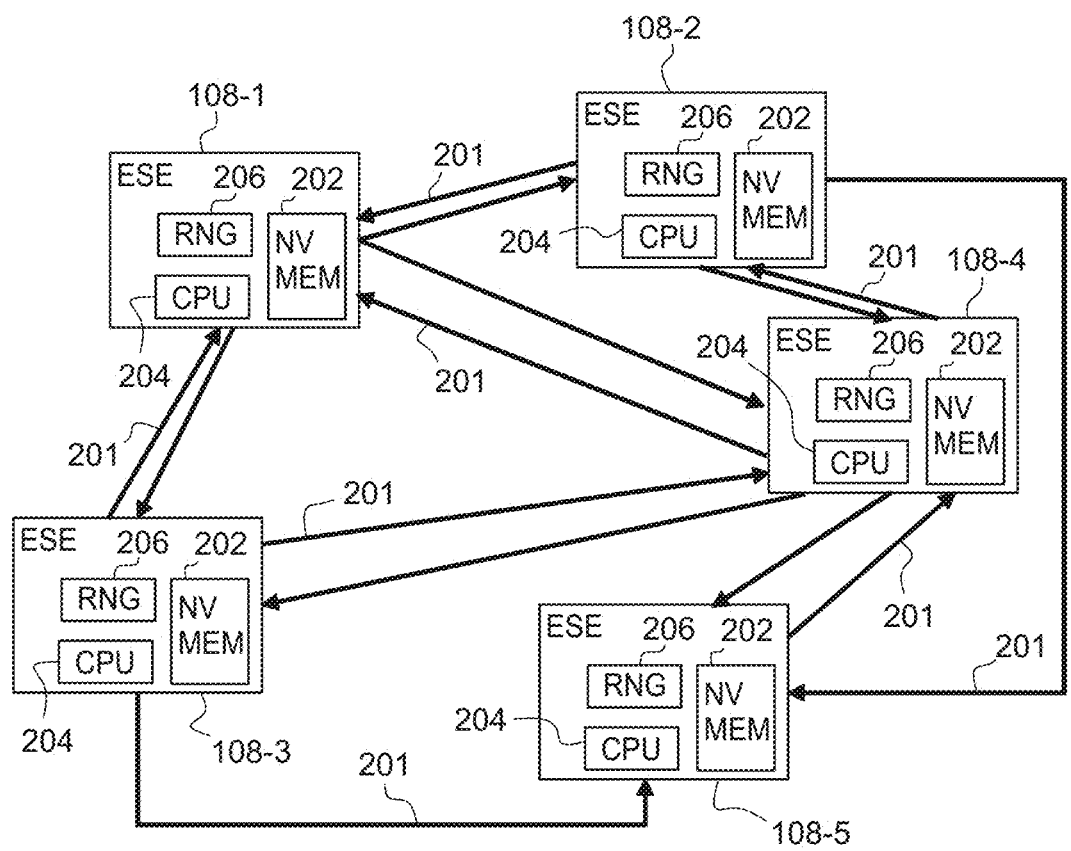
FIG. 2 is a block diagram showing a network of secure circuits.

FIG. 2 is a block diagram of secure circuits 108-$i$ (ESE) distributed in a network 200 in a data storage system, for example within the motor vehicle. Although the network 200 shown in FIG. 2 comprises secure circuits 108-1 to 108-5, it is possible for network 200 to be formed of a larger, or smaller, number of secure circuits. As an example, network 200 comprises some ten secure circuits. As an example, each secure circuit 108-$i$ belongs to a different operating domain of the vehicle. In another example, two secure circuits among the secure circuits of network 200 belong to a same operating domain of the vehicle.

As an example, each secure circuit 108-$i$ is coupled to each of the other secure circuits 108-$i$ via a link 201. For clarity, FIG. 2 only illustrates certain links 201 between secure circuits 108-$i$. As an example, links 201 are, for example, formed in wired fashion and implement, for example, a wired communication protocol, such as an Ethernet protocol. In another example, links 201 are wireless a links, implementing communication protocol of WiFi or 5G type.

Each secure circuit 108-$i$ comprises one or more storage means, such as a register or a non-volatile memory 202, enabling to securely store data. In particular, each secure circuit 108-$i$ is resistant to a side channel attack. Mechanisms of protection against such attacks are well known to those skilled in the art, and will not be detailed herein. According to an embodiment, each non-volatile memory 202 is configured to store a sequence of history data in a data structure forming a blockchain.

Each secure circuit 108-$i$ further comprises, for example, a processor 204 (CPU) and a number generator 206 (RNG). When router 102 orders the storage of history data 104, each number generator 206 is configured, for example, to generate a value and to transmit it to the processor 204 of the secure circuit. Processor 204 is then configured to verify whether the generated value solves a mathematical problem predefined upstream.

As an example, the mathematical problem to be solved consists in finding a challenge value for a given response value. For example, a main processor, which may be another processor of system 100 (not shown) connected to network 200, or one of the processors 204 of secure circuits 108-$i$ generates a target hash value, for example randomly, and transmits it to each of secure circuits 118-$i$. Each number generator 206 then generates a candidate value that it transmits to the corresponding processor 204. Each processor 204 is then configured to apply to the candidate value a hash function, for example SHA-256, SHA-512, etc., and to verify whether the value obtained as a result of the hashing of the candidate value matches the target hash value transmitted by the main processor. As soon as a secure circuit 108-$i$ detects that a generated candidate value corresponds to a value which, as a result of the hash operation, results in the target hash value, the generated candidate value becomes a potential proof of work, and this value is transmitted, by the secure circuit in question, to each of the other secure circuits 108-$i$. Each of the other secure circuits 108-$i$ is then configured to verify that the potential working value, transmitted by the secure circuit in question, effectively results, as a result of the application of the hash function, in the target hash value. The generated value then forms a proof of work.

Generally speaking, as an alternative to a hash function, other mathematical problems may be provided to secure circuits 108-$i$. The principle being that each secure circuit 108-$i$ tests one by one values generated by its number generator 206 in order to verify whether they match a challenge value for a given response value, e supplied by the main processor, and for a mathematical problem of "challenge-response" type defined upstream. The mathematical problem is such that the challenge value is difficult to find, but easy to verify. Thus, the relationship between the challenge value and the response value may be a hash function, or another cryptographic operation. The operation linking the challenge value to the response value is a bijective operation, each response value is for example associated with a single challenge value.

According to an embodiment, the storage of the history data in each of secure circuits 108-$i$ is conditioned by searching for the proof of work.

Figure 3:
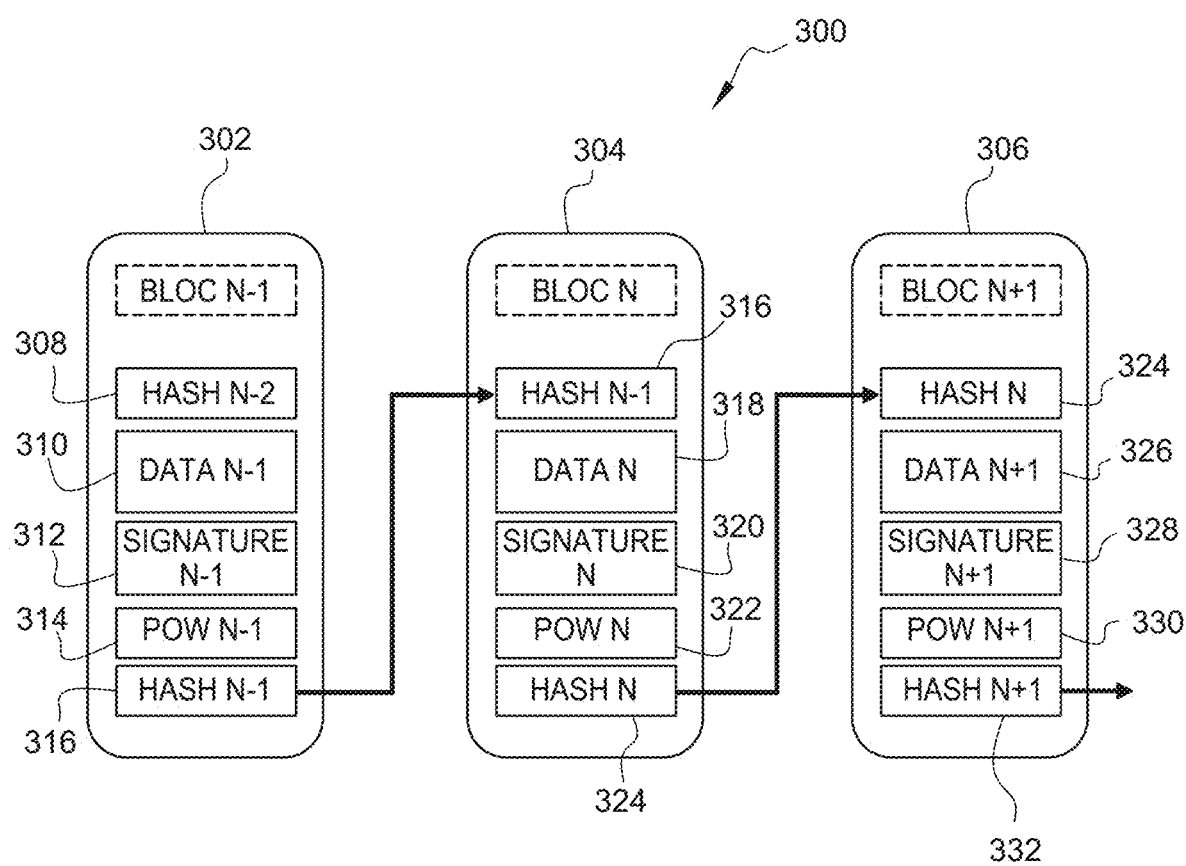
FIG. 3 illustrates a structure of data storage in the secure circuits, according to an embodiment of the present disclosure.

FIG. 3 illustrates an example of a structure 300 of data storage in the secure circuits 108-$i$ of FIGS. 1 and 2, according to an embodiment of the present disclosure.

According to an embodiment, each secure circuit 108-$i$ comprises storage structure 300. In certain embodiments, structure 300 and the data contained therein are exactly identical from one secure circuit 108-$i$ to the other.

According to an embodiment, structure 300 takes the form of a blockchain. Each time router 102 controls the storage of history data, a new block is added to the sequence of existing blocks. The blockchain thus comprises a history of parameters and/or of states describing the operation of the motor vehicle since, for example, its first registration.

In particular, FIG. 3 illustrates three successive blocks 302 (BLOCK N−1), 304 (BLOCK N), and 306 (BLOCK N+1) of blockchain 300.

Block 302 for example comprises an identification value 308 (HASH N−2) identifying the immediately preceding block in blockchain 300. As an example, the identification value 308 is a value obtained as a result of the application of a hash application to the contents of the immediately preceding block.

Block 302 also comprises history data 310 (DATA N−1) associated with the N−1-th storage order, where N being an integer greater than or equal to 1. Block 302 also comprises a signature value 312 (SIGNATURE N−1). As an example, signature value 312 is a signature obtained based on data 310.

According to an embodiment, block 302 further comprises the value of a proof of work 314 (POW N−1). Proof of work 314 is, for example, a value generated by one of secure circuits 108-$i$ and solving a mathematical problem. This value is verified by the other secure circuits 108-$i$ and, if the verification is successful, the value is stored as a proof of work in block 302. The search for the proof of work 314 is performed as a result of the order to store data 310. The construction of block 302 is performed once proof of work 314 has been found and verified by all secure circuits 108-1.

Block 302 further comprises an identification value 316 (HASH N−1) identifying block 302. Identification value 316 is calculated, for example, by each processor 204, by applying a hash operation to identification value 308, data 310, signature 312, and proof of work 314. As an example, the hash operation is applied to a concatenation of values and data 308, 310, 312, and 314.

Block 304 is then added to blockchain 300, directly after block 302. As an example, block 304 is added as a result of the order to store new history data 318 (DATA N) acquired, for example, directly after history data 310.

The identification value 316 of block 302 is stored in block 304. The storage of identification value 316 in block 304 enables to link blocks 302 and 304 together. It is then impossible for a third party to add another block between blocks 302 and 304.

Block 304 further comprises history data 318 and a signature value 320 (SIGNATURE N). Signature value 320 is, for example, a signature of history data 318. Just like block 302, block 304 includes a proof of work 322 (POW 322).

Proof of work 322 is searched for as a result of the order to store data 318. In particular, the value of proof of work 322 differs from the value of proof of work 314 because it solves a different mathematical problem than that used for the search for proof of work 314. As an example, the main processor generates a new hash value at each order to store history data and supplies it as a response value to each of secure circuits 108-$i$. The proof of work for each block of blockchain 300 then matches the challenge value resulting in the supplied response value.

Block 304 also comprises an identification value 324 (HASH N). As an example, identification value 324 is obtained by applying a hash operation to values and data 316, 318, 320, and 322.

The identification value 324 will then be stored in block 306, directly following block 304 in order to directly link the two blocks. The structure of block 306 is identical to that of blocks 302 and 304. In other words, block 306 comprises, in addition to identification value 324, history data 326 (DATA N+1) acquired after data 318, a signature 328 (SIGNATURE N+1), and a proof of work 328 (POW N+1). Proof of work 330 is searched for based on a response value different from those used for blocks 302 and 304. Block 306 will also include an identification value 332 (HASH N+1) calculated based on values and data 324, 326, 328, and 330. Identification value 332 will then also be stored in the block directly following block 306 in order to directly link them.

As an example, for each of the blocks of blockchain 300, and in particular for blocks 302, 304, and 306, the values of identification 308, 316, and 324 of the immediately preceding block are stored at the beginning of the block, respectively followed, in the order, by history data 310, 318, and 326, signature 312, 320, or 328, proof of work 314, 322, or 330, and then identification value 316, 324, or 332. As an example, each block of blockchain 300 begins with the identification value of the immediately preceding block and ends with its own identification value.

Figure 4:
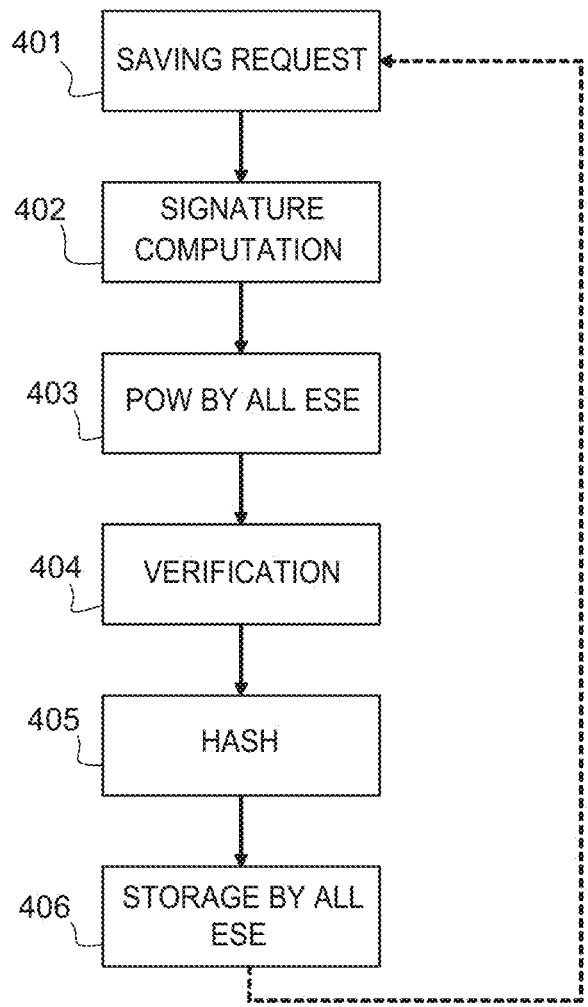
FIG. 4 is a flowchart illustrating steps of a data storage method, according to an embodiment of the present disclosure.

FIG. 4 is a flowchart illustrating steps of a data storage process, according to an embodiment of the present disclosure.

At a step 401 (SAVING REQUEST), a request to store history data is made. As an example, the request is made by router 102 or by the main processor, and is transmitted to secure circuits 108-$i$.

As an example, the method continues in a step 402 (SIGNATURE COMPUTATION) where a signature of the history data is calculated. As an example, the signature is calculated by each processor 204 of secure circuits 108-$i$.

At a step 403 (POW BY ALL ESE), the main processor provides, for example, a same mathematical problem to each of secure circuits 108-$i$. As an example, the main processor supplies a value, for example randomly generated, to secure circuits 108-$i$. As an example, the value matches a hash value, or more generally the result of a bijective cryptographic operation on a challenge value. The resolution of the mathematical problem corresponds to searching, by each of secure circuits 108-$i$ independently from one another, for the challenge value, which, when the hash operation or, more generally, the bijective cryptographic operation is applied thereto, results in the value generated by the main processor. For example, the problem resolution is performed, in each of the secure circuits 108-$i$, by a first cryptographic circuit (not illustrated in FIG. 2). For example, the cryptographic parameters, such as encryption keys or decryption keys, or both encryption keys and decryption keys, are identical from one cryptographic circuit of a secure circuit 108-$i$ to another.

The search for the challenge value comprises the generation, by each of the number generators 206 of each of secure circuits 108-$i$, of a candidate value and the verification, for example by processors 206, or by the cryptographic circuit, of whether the generated candidate value matches the challenge value for the response value supplied by the main processor. Secure circuits 108-$i$ thus search, in parallel and independently from one another, for the value corresponding to the challenge for the supplied response value.

During the carrying out of step 403, secure circuits 108-$i$ compete with one another. As long as the value has not been found, the secure circuits are configured to regenerate new values and test them, each on its own.

When one of secure circuits 108-$i$ finds the right challenge value, the value is transmitted, at a step 404 (VERIFICATION), to the other secure circuits 108-$i$. The other circuits 108-$i$ are then configured to verify, for example via processors 204, whether the value is effectively the right challenge value. If the supplied challenge value is finally not the right one, secure circuits 108-$i$ are all configured to resume the search.

If, as a result of the verification by each of secure circuits 108-$i$, it is determined that the supplied value effectively is the challenge value corresponding to the response value supplied by the main processor, the search ends. The verified challenge value is then stored in each of secure circuits 108-$i$ and forms a proof of work.

At a step 405 (HASH), a hash operation is for example applied, by each of processors 206, to the identification value of the last block of the blockchain 300 stored, for example, in each of volatile memories 204. The hash operation is further applied to the history data, for example supplied by router 102, to the signature value calculated when step 402 is being carried out, and to the proof of work, verified during the carrying out of step 404. The result of the hash operation then forms an identifier of the block of the blockchain into which the history data will be stored. For example, each secure circuit 108-$i$ comprises a second cryptographic circuit configured to perform the hash operation. For example, the parameters of the second cryptographic circuits differ from one secure circuit 108-$i$ to another. Hence, in the case that a hacker succeeds in obtaining the parameters of one of the second cryptographic circuits, they will not be able to modify the blockchains stored in the other secure circuits 108-$i$.

After the calculation of the identification value, a new block is added, for example by each processor 204, to the blockchain stored, for example, in non-volatile memory 202. Each processor 204 is further configured to store, in this new block and at a step 406 (STORAGE BY ALL ESE), the identification value of the immediately preceding block, the history data, the signature value, the proof of work, and the identification value calculated at step 405. An example of the structure of the blockchain stored in memory 202 and of the structure of each block is described in relation with FIG. 3.

Once step 406 has been carried out, each secure circuit 108-$i$ comprises a blockchain, stored in its non-volatile memory 202. For each secure circuit 108-$i$, the blockchain is identical to the other blockchains stored in the other secure circuits 108-$i$. Thus, each secure circuit 108-$i$ comprises a sequence of history data values, each element of the sequence being stored, in a block of the chain, in association with other values, such as the identification values, the signature value, and the proof of work. For example, the sequence of history data or the full blockchain, or the sequence of history data and the full blockchain, are stored in each of the secure circuits 108-$i$ in a ciphered fashion. For example, each second cryptographic circuit is configured to cipher the sequence of history data.

After step 405, the method resumes with a new implementation of step 401, when other history data values will have to be stored. For example, when the motor vehicle is running, the method is repeated at regular time intervals. As an example, the stopping of the engine also causes the carrying out of step 401. At each execution of the sequence of steps 401 to 406, the response value supplied by the main processor for the resolution of the mathematical problem differs. Further, each time the sequence of steps 401 to 406 has been carried out, a new block is added to the sequence of already-existing blocks in each blockchain.

An advantage of the described embodiments is that a history of the operation of the motor vehicle is simultaneously stored in a plurality of secure circuits distributed throughout the vehicle. Thus, if one circuit is damaged, for example as a result of a crash, the history can still be retrieved from the other secure circuits.

Another advantage of the described embodiments, and more particularly an advantage deriving from the structure for storing history data, is that the blockchain cannot be modified, and in particular cannot be modified by a third party. Indeed, due to the use of identification values, it is not possible to insert a block between two already-existing blocks. Similarly, it is not possible to add a block without knowing the verification value of the immediately preceding block. It is not possible either to modify the content of a block. Indeed, the identification value of a block is calculated based on the history data supplied by router 102. Thus, modifying the data would result in the loss of any consistency in the structure of the blocks and of the blockchain.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove. In particular, regarding the search for the proof of work, other mathematical problems than those described may of course be used. The proof of work principle being known to those skilled in the art, they will be capable of adapting and selecting a suitable type of mathematical problem.

The invention claimed is:

1. A method comprising:
   transmitting, by at least one peripheral circuit of a data storage system for a motor vehicle to at least two secure circuits of the motor vehicle, one or more data values to be stored;
   searching, by each of the at least two secure circuits, for a proof of work;
   transmitting, by a first circuit and when a first one of the at least two secure circuits has found a potential proof of work, the potential proof of work found to each of the other secure circuits of the at least two secure circuits;
   verifying, by each of the other secure circuits, of the potential proof of work; and
   storing, in each of the secure circuits and if the verifying confirms that the potential proof of work matches the proof of work searched for, the one or more data values in a current block of a blockchain, wherein the one or more data values is stored in association with an identification value identifying an immediately preceding block in the blockchain, the proof of work, and an identification value identifying a current block in the blockchain, wherein the identification value of the current block is calculated based on the identification value of the immediately preceding block, on the one or more data values, and on the proof of work.

2. The method of claim 1, further comprising, prior to the storing in each of the at least two secure circuits, calculating a signature value based on the one or more data values, the identification value of the current block being further calculated based on the signature value.

3. The method of claim 1, wherein the identification value of the current block is a hash value.

4. The method of claim 1, wherein searching for the proof of work, by each of the at least two secure circuits, comprises:
   a) generating, by a number generator of a respective circuit, a candidate value;
   b) supplying the candidate value to a processor of the respective circuit;
   c) verifying whether the candidate value matches a target challenge value for a given response value; and
   d) repeating, if the candidate value does not match, a), b), and c) one or more times.

5. The method of claim 4, wherein the candidate value matching the target challenge value is the proof of work.

6. The method of claim 1, wherein the one or more data values correspond to recordings of parameters of the motor vehicle when its engine is running.

7. The method of claim 1, further comprising other transmissions, by the at least one peripheral circuit to the at least two secure circuits, of one or more other data values to be stored, the other transmissions taking place at regular time intervals.

8. A data storage system for a motor vehicle comprising:
   at least one peripheral circuit configured to transmit, to at least two secure circuits, one or more data values to be stored;
   wherein the at least two secure circuits are each configured to search for a proof of work;
      wherein, as soon as a potential proof of work has been found by at least a first circuit of the two secure circuits, the first circuit is further configured to transmit the found potential proof of work to each of the other secure circuits among the at least two secure circuits;
   wherein the other secure circuits are further configured to verify the potential proof of work; and
   wherein, if the potential proof of work effectively matches the proof of work searched for, the at least two secure circuits are further configured to store the one or more data values in a block of a blockchain, the one or more data values being stored in association with an identification value identifying an immediately preceding block in the blockchain, the proof of work, and an identification value identifying a current block, the identification value of the current block being calculated based on the identification value of the immediately preceding block, on the one or more data values, and on the proof of work.

9. The data storage system of claim 8, wherein the at least two secure circuits are distributed in a network in the motor vehicle, each circuit being coupled to each of the other secure circuits by a communication link.

10. The data storage system of claim 9, wherein the communication link between the secure circuits uses a wired communication protocol, for example of Ethernet type or of controller area network CAN type.

11. The data storage system of claim 9, wherein the network formed by the secure circuits uses a wireless communication protocol.

12. The data storage system of claim 9, wherein the network is formed of 5 or more, and at most 20, secure.

13. The data storage system of claim 9, wherein the at least one peripheral circuit is configured to record one or more parameters of the vehicle, the one or more parameters corresponding to the one or more data values transmitted.

14. A secure circuit comprising:
  a number generator configured to generate candidate values;
  a processor configured to verify whether each candidate value generated matches a target challenge value;
  a non-volatile memory storing a blockchain;
  wherein the secure circuit is configured to:
    transmit, when a candidate value matches the target challenge value, the candidate value as being a proof of work to other secure circuits, or
    receive a proof of work transmitted by another secure circuit;

wherein the processor is further configured to verify whether the proof of work matches the target challenge value;

wherein the non-volatile memory is further configured to store, in a current block of the blockchain, one or more data values in association with an identification value identifying a block immediately preceding the current block, an identification value identifying the current block, and the proof of work;

wherein the processor being further configured to generate a value of the current block based on the identification value of the immediately preceding block, on the one or more data values, and on the proof of work.

* * * * *